United States Patent
Farley et al.

(10) Patent No.: US 7,944,845 B2
(45) Date of Patent: *May 17, 2011

(54) APPLICATION SPECIFIC TRAFFIC OPTIMIZATION IN A WIRELESS LINK

(75) Inventors: Kevin L. Farley, Palm Bay, FL (US); James A. Proctor, Jr., Indialantic, FL (US)

(73) Assignee: IPR Licensing, Inc., Wilmington, DE (US)

( * ) Notice: Subject to any disclaimer, the term of this patent is extended or adjusted under 35 U.S.C. 154(b) by 997 days.

This patent is subject to a terminal disclaimer.

(21) Appl. No.: 11/193,587

(22) Filed: Jul. 29, 2005

(65) Prior Publication Data

US 2005/0265246 A1    Dec. 1, 2005

Related U.S. Application Data

(63) Continuation of application No. 09/777,555, filed on Feb. 5, 2001, now Pat. No. 6,937,562.

(51) Int. Cl.
*H04L 12/26* (2006.01)
(52) U.S. Cl. ........................................ 370/252
(58) Field of Classification Search .............. 370/235, 370/252, 395.52, 913
See application file for complete search history.

(56) References Cited

U.S. PATENT DOCUMENTS

| | | | |
|---|---|---|---|
| 5,778,316 A * | 7/1998 | Persson et al. | 455/434 |
| 5,867,494 A | 2/1999 | Krishnaswamy et al. | |
| 5,867,495 A | 2/1999 | Elliott et al. | |
| 5,959,968 A | 9/1999 | Chin et al. | |
| 5,999,525 A | 12/1999 | Krishnaswamy et al. | |
| 6,028,848 A | 2/2000 | Bhatia et al. | |
| 6,091,737 A | 7/2000 | Hong et al. | |
| 6,108,330 A | 8/2000 | Bhatia et al. | |
| 6,115,393 A | 9/2000 | Engel et al. | |
| 6,151,332 A | 11/2000 | Gorsuch et al. | |
| 6,161,008 A | 12/2000 | Lee et al. | |
| 6,163,532 A | 12/2000 | Taguchi et al. | |
| 6,163,543 A | 12/2000 | Chin et al. | |
| 6,167,445 A | 12/2000 | Gai et al. | |
| 6,560,239 B1 * | 5/2003 | Frid et al. | 370/426 |
| 6,580,704 B1 * | 6/2003 | Wellig et al. | 370/338 |
| 6,738,352 B1 | 5/2004 | Yamada et al. | |
| 2004/0077349 A1 * | 4/2004 | Barak et al. | 455/436 |
| 2004/0136400 A1 * | 7/2004 | Majidi-Ahy et al. | 370/469 |
| 2007/0005795 A1 * | 1/2007 | Gonzalez | 709/232 |

* cited by examiner

*Primary Examiner* — Man Phan
*Assistant Examiner* — Nourali Mansoury
(74) *Attorney, Agent, or Firm* — Volpe & Koenig, P.C.

(57) ABSTRACT

A packet data system such as a TCP/IP network transmits packets containing a variety of data types along links in the network. Packets are transmitted in a stream between nodes interconnected by the links, which conform to a transport layer protocol such as TCP, UDP, and RSTP, and include wireless links, which transmit packets using a radio frequency (RF) medium. Typical protocols, however, are usually developed to optimize throughput and minimize data error and loss over wired links, and do not lend themselves well to a wireless link. By examining the data in a packet, performance characteristics such as a port number are determined. The performance characteristics indicate the application type, and therefore, the data type, of the packets carried on the connection. Since certain data types, such as streaming audio and video, are more loss tolerant, determination of the data type is used to compute link control parameters for the wireless link that are optimal to the type of data being transmitted over the link.

11 Claims, 9 Drawing Sheets

| FLOW MODEL IDX | PROTOCOL ID | WELL-KNOWN PORT NUMBER | RTP PAYLOAD TYPE | APPLICATION ID | TRANS. MODEL IDX |
|---|---|---|---|---|---|
| F1 | tcp | 80 | nil | www | t10 |
| F2 | udp | 69 | nil | tftp | t20 |
| F3 | udp | 7070 | audio | realaudio | t30 |
| ... | | | | | |
| Fn | | | | | |

FIG. 3

| TRANS. MODEL ID | MODULATION TYPE | ARQ DISABLE | CODING RATE | MIN. SUGG. BW | AVG. SUGG. BW | MAX. SUGG. BW | DELAY | JITTER |
|---|---|---|---|---|---|---|---|---|
| t10 | | N | | | | | | |
| t20 | | N | | 48k | 64k | 80k | | |
| t30 | | Y | | 28k | 32k | 40k | | |
| ... | | | | | | | | |
| tn | | | | | | | | |

FIG. 4

APPLICATION SPECIFIC TRAFFIC OPTIMIZATION IN A WIRELESS LINK

RELATED APPLICATION(S)

This application is a continuation of U.S. application Ser. No. 09/777,555, filed Feb. 5, 2001 now U.S. Pat. No. 6,937,562. The entire teachings of the above application are incorporated herein by reference.

BACKGROUND OF THE INVENTION

In a typical data communication system, packets containing a variety of data types are transmitted between different nodes of a network, typically in a client-server manner. The packets are transmitted in a stream from a source node to a destination node. The nodes are interconnected via physical connections that conform to a link layer protocol such as HDLC, ATM, and frame relay, for example. These connections may include wireless links, which transmit packets using a radio frequency (RF) medium.

The transport layer, however, is typically indifferent to the link layer protocols and whether the link layer is a wireless or wired link. However, wired and wireless links usually exhibit different performance characteristics. For example, wireless links typically exhibit higher error rates, longer latency times, and limited throughput depending on the number of users supported. Many transport layer protocols, however, were developed according to wired link performance expectations, and do not lend themselves to efficient implementation over wireless links. Therefore, connections that include a wireless link may suffer from performance degradation since the transport layer protocols, such as TCP, UDP, and RSTP, are not sensitive to specific performance and behavior characteristics of wireless links.

The transport layer protocols are implemented to prevent inaccuracies in the data such as packet loss and transmission errors in the packet. However, certain applications employ data types that are more loss-tolerant and do not need to assure absolute accuracy in the received data stream. For example, data types such as streaming audio and video can tolerate lost packets and bit errors without substantially compromising the output perceived by a user. On the other hand, data types such as an executable file would likely result in unpredictable results if even one bit is inaccurately received.

It would be beneficial, therefore, to provide a system and method to determine the application and performance metrics corresponding to a connection, and modify related link control parameters of the wireless link according to a corresponding flow model. The link control parameters may adjust the physical layer characteristics, such as bandwidth, coding levels, and the like, to tolerate packet loss when appropriate. This increases the overall perceived throughput over the wireless link.

SUMMARY OF THE INVENTION

A system and method for application specific control of wireless link control parameters determines link performance characteristics of a connection, and modifies the link control parameters of the connection according to a corresponding flow model to tolerate packet loss and error when appropriate to increase the overall throughput over the wireless link. Link performance characteristics indicative of a flow of a stream of packets are determined. The link performance characteristics are analyzed to determine a flow model. A transfer model is computed and mapped based on the flow model, and the link control parameters corresponding to the transfer model are then applied to the connection.

A packet in an incoming stream of packets received over a connection is examined to determine a corresponding set of link performance characteristics. A particular packet in the stream is usually indicative of other packets in the stream. Accordingly, the stream of packets will tend to conform to the link performance characteristics exhibited by any one of the packets in the stream. Link performance characteristics such as a protocol type, port number, payload type, control bits, and others may be examined. The link performance characteristics are analyzed by a link controller to determine a flow model, such as by matching the link performance characteristics to a flow model table having entries of link performance metrics. In TCP/IP packet systems, for example, a packet has a link performance characteristic called a port number. Certain predetermined port numbers correspond to particular applications.

The entries in the flow model table are mapped to a transfer model table. Alternatively, other computations could be performed to compute a transfer model based on the flow model. The transfer model table has entries containing link control parameters. The link control parameters may include, for example, modulation type, ARQ disable flag, coding rate, delay, jitter, minimum suggested bandwidth, average suggested bandwidth, maximum suggested bandwidth, and others. The link control parameters included in each transfer model are selected to provide optimal wireless transmission for the flow model selected. The link controller applies the link control parameters corresponding to the selected transfer model to the connection. In this manner, a wireless link can be optimized by modifying link control parameters according to the type of data carried in the packets based on a loss tolerance corresponding to the data type.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 shows the flow model table;

FIG. 4 shows the transfer model table;

DETAILED DESCRIPTION OF THE INVENTION

A description of preferred embodiments of the invention follows.

Figure 1:
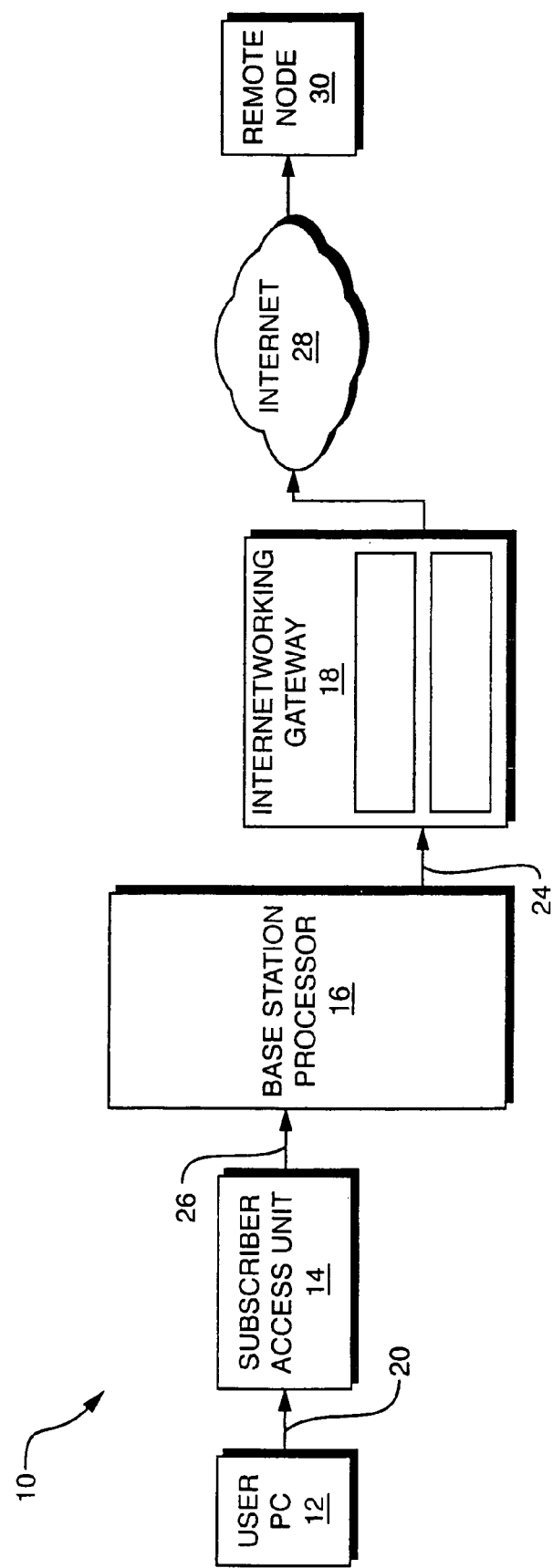
FIG. 1 is a wireless communication system suitable for performing application specific traffic optimization.

Referring to FIG. 1, in a computer network 10, such as a network using the TCP/IP protocol, a logical connection is maintained between a local node or user 12 and a remote node 30. The user node 12 may, for example be a personal computer (PC) and the remote node 30 may be a file server such as a web server. Data is carried between the user 12 and the remote node 30 by transmitting data in formatted packets, which flow in a stream over the connection. The connection includes both wired links 20, 24 and a wireless link 26. The wireless link 26 is maintained by a base station processor 16 and a subscriber access unit 14, which is in turn connected to the user 12. The base station processor 16 connects to a public access network such as the Internet 28 via an internetworking gateway 18 over the wired link 24. A user 12 can therefore maintain wireless connectivity to a remote node 30 via the wireless link 26 provided by the base station processor 16 and the subscriber access unit 14. The connection between the remote node 30 and the user 12 conforms to a protocol, such as TCP/IP. As described above, TCP/IP was developed for wired networks, and, accordingly, does not lend itself directly to efficient transmissions over the wireless link 26.

Figure 2:
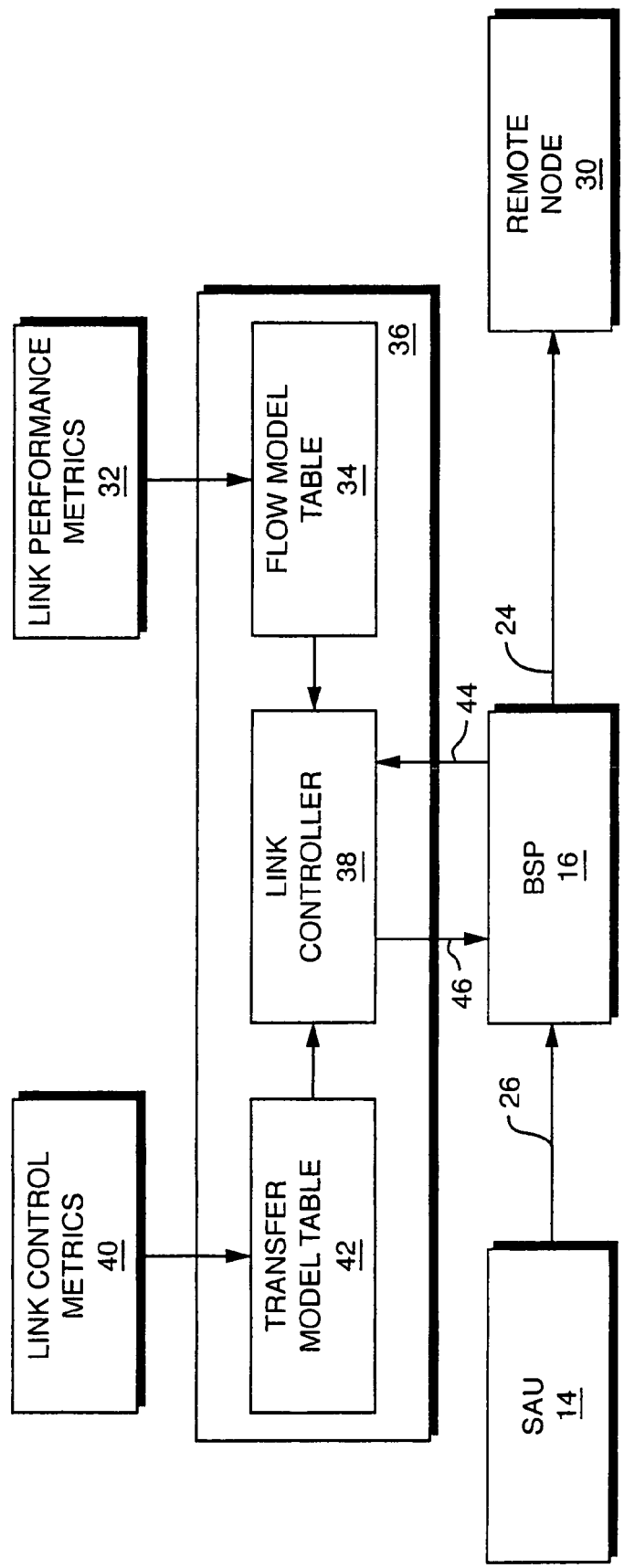
FIG. 2 is a block diagram of the traffic optimization system.

Referring to FIG. 2, a block diagram of the present invention is shown. The base station processor 16 maintains a table of link performance metrics 32 and link control metrics 40. A link analyzer 36 includes a link controller 38, a flow model table 34, and a transfer model table 42. The set of link performance metrics 32 is defined to enumerate link performance characteristics 44 that can be monitored.

The flow model table 34 is defined to specify link performance metrics 32 included in a particular flow model stored in the flow model table 34. The link controller 38 is operable to analyze link performance characteristics 44 in the packets sent from the remote node 30 over the wired link 24. The link performance characteristics 44 are analyzed by comparison with flow model entries in the flow model table 34. The transfer model table 42 is defined from the link control metrics 40, and stores transfer model entries including one or more link control parameters 46 corresponding to a particular flow model entry in the flow model table 34.

The analysis of the link performance characteristics 44, described further below, determines a flow model 34 indicative of the stream of packets being transmitted over the link. The link controller 38 computes a corresponding transfer model entry by mapping into the transfer model table 42. The corresponding transfer model entry in the transfer model table 42 defines one or more link control parameters 46 of the transfer model entry. The link controller 38 then applies the link control parameters 46 to the wireless link 26 via the base station processor 16.

Referring to FIG. 3, the flow model table 34 is shown having flow model entries 34a, 34b, 34c, . . . 34n. As described above, each flow model entry 34n defines link performance metrics 32 corresponding to the data type of a particular stream of packets. In one embodiment, a packet based network associates ports with applications. By examining the port associated with a transmitted packet, the application type can be determined. For example, in a TCP/IP network, certain well known port numbers 48 are predetermined and identified by RFC 1700 promulgated by the Internet Engineering Task Force (IETF). The flow model entry 34n corresponding to the well known port number 48 determines the application type 50. The application type 50 is indicative of the loss tolerance of the stream. For example, flow model entry 34c indicates a streaming audio data type. Streaming audio is generally thought to be more loss-tolerant because lost or erroneous packets would merely be heard as a slight pop or glitch in the output audio signal heard by the user. On the other hand, flow model entry 34b corresponds to a file transfer, and accordingly, is not tolerant to lost or erroneous packets. The use of the port number as a link performance characteristic as defined herein is exemplary. Other performance characteristics, such as those defined in the flow model table 34 and others, could be employed in computing the transfer model.

The flow model is employed to compute a transfer model directed towards optimizing the packet traffic flow on a particular connection. Referring to FIGS. 2, 3 and 4, each flow model entry 34n includes a transfer model index 52. A transfer model entry 54n is computed by mapping the transfer model index 52 into the transfer model table 42 to determine the corresponding transfer model entry 54n. The corresponding transfer model entry 54n includes link control metrics 40 operable to modify the connection. The link control parameters 46 of the corresponding transfer model entry are applied to the connection. In alternative embodiments, additional computations could be performed to compute the link control parameters.

Figure 5A:
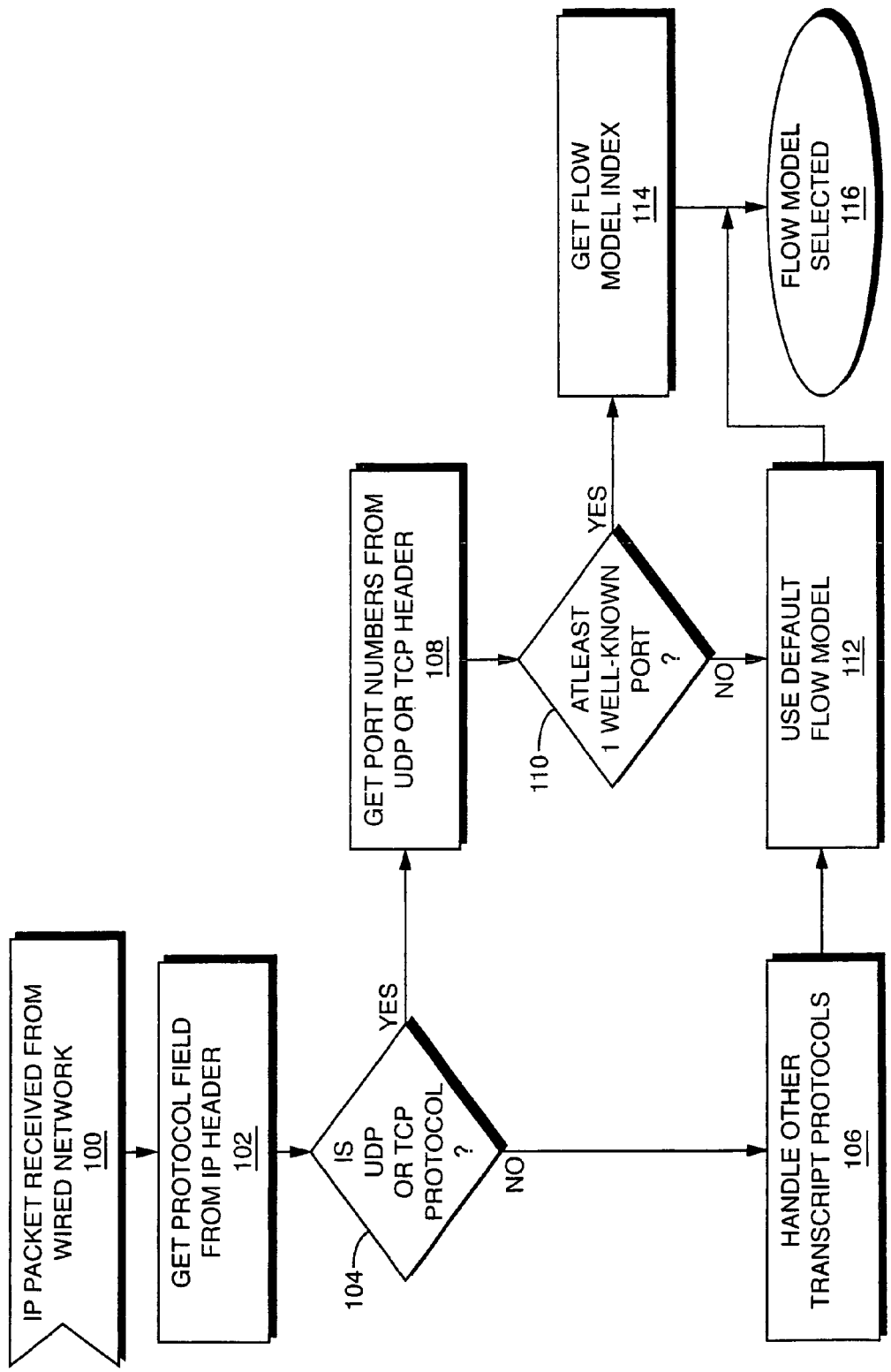
FIGS. 5a-5c show a flowchart of application specific traffic optimization.
Figure 5B:
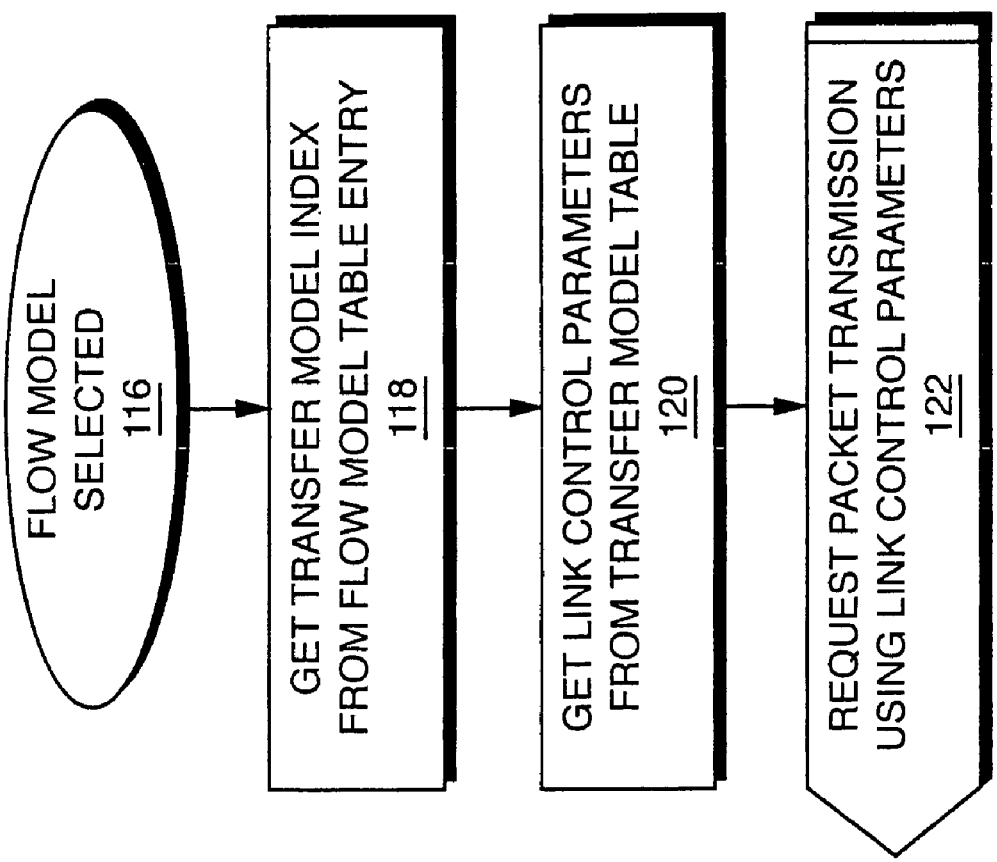
Figure 5C:
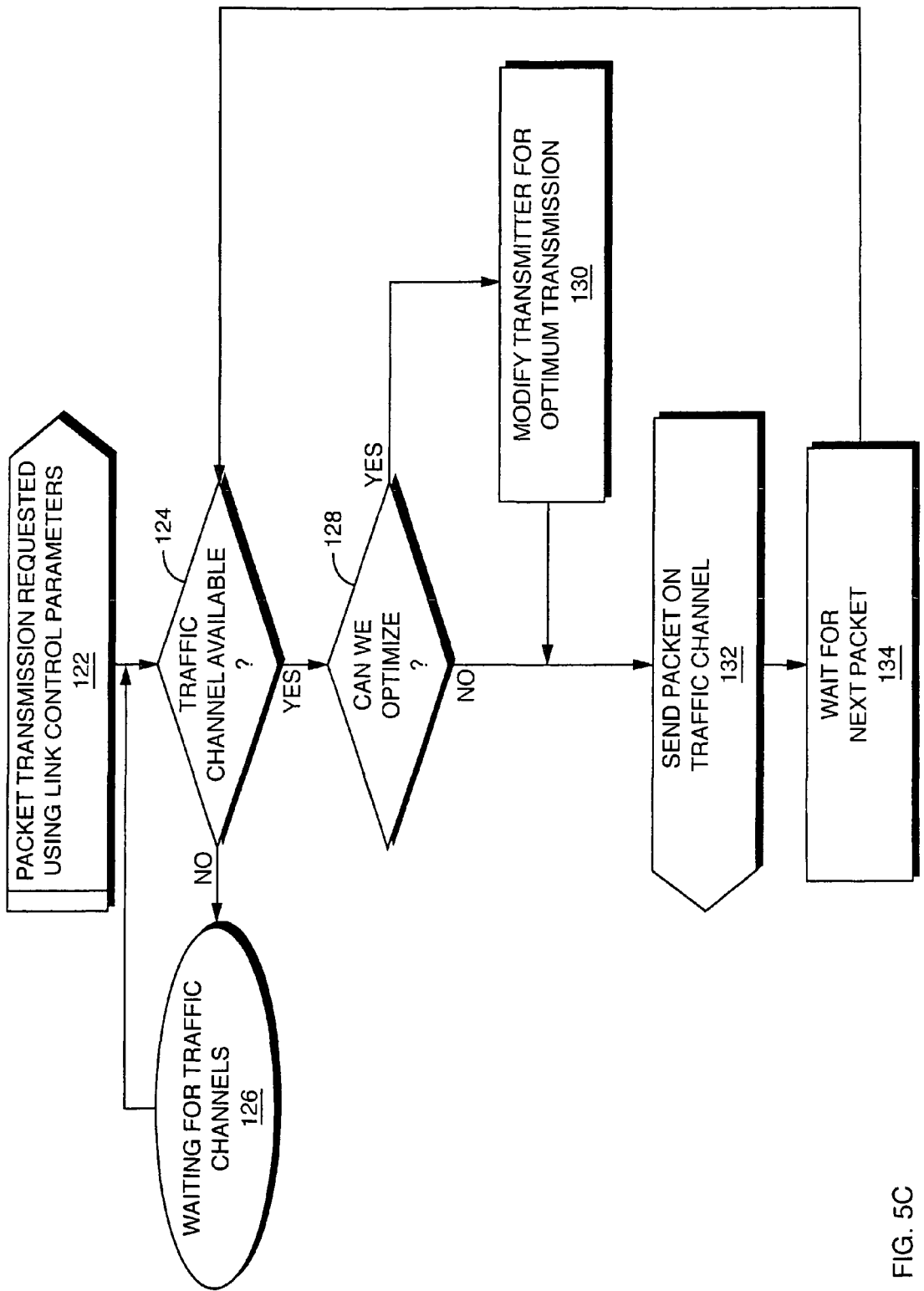

FIGS. 5a-5c illustrate a flowchart of a particular embodiment of message flow, as defined herein, which invokes an IP port number as a link performance characteristic. An IP packet is received from the wired network, as depicted at step 100. The protocol field is read from the IP header in the packet, as shown at step 102. It should be noted, however, that other discriminating characteristics of the packets may be examined to construct message flows. In a particular embodiment, the protocol field is examined to determine if the protocol is TCP or UDP, as disclosed at step 104. If the protocol is not TCP or UDP, then an alternate protocol is handled, as depicted at step 106, and control continues as described below at step 112.

If the protocol is TCP or UDP, the port numbers are then read from the header, as shown at step 108. A typical header has both a source and a destination port. Either port may be indicative of an application and hence, a data type. A check is made to determine if there is at least one well-known port, as disclosed at step 110. If there is not a well-known port, then the default flow model is allowed to persist, as shown at step 112. Referring back to FIG. 3, if there is a well-known port, the flow model index 55 corresponding to the port is determined, as disclosed at step 114, and the corresponding flow model entry 34n is determined, as disclosed at step 116. The check may include parsing the flow model table to find a matching well-known port number 48, and may include other operations directed towards determining a particular flow model entry 34n.

Referring to FIGS. 3, 4, and 5b, the selected flow model 34n is read to determine the corresponding transfer model index 52, as depicted at step 118. The transfer model index 52 is invoked to determine a transfer model entry 54a, 54b, 54c, . . . or 54n in the flow model table 42, and the corresponding link control parameters 46 are retrieved, as shown at step 120. Other computations may also be employed to determine link control parameters, in addition to the transfer model table 42 lookup described above. Packet transmission employing the link control parameters 46 is requested, as disclosed at step 122, by applying the link control parameters 46 to the connection.

Referring to FIG. 5c, a check is made to determine if a wireless traffic channel is available, as shown at step 124. If a wireless traffic channel is not available, a wait is performed until a traffic channel becomes available, as depicted at step 126. When a traffic channel is available, a check is performed to see if the link control parameters can be applied at this time for this packet as shown in step 128. If the check is successful, the transmitter of the wireless signal is optimized according to the link control parameters established for the connection, as depicted at step 130. The packet is then sent on the traffic channel, as depicted at step 132, and a wait is performed for the next packet to be received as depicted at step 134. Control then reverts to step 100 above as new IP packets are received from the network.

Figure 6:
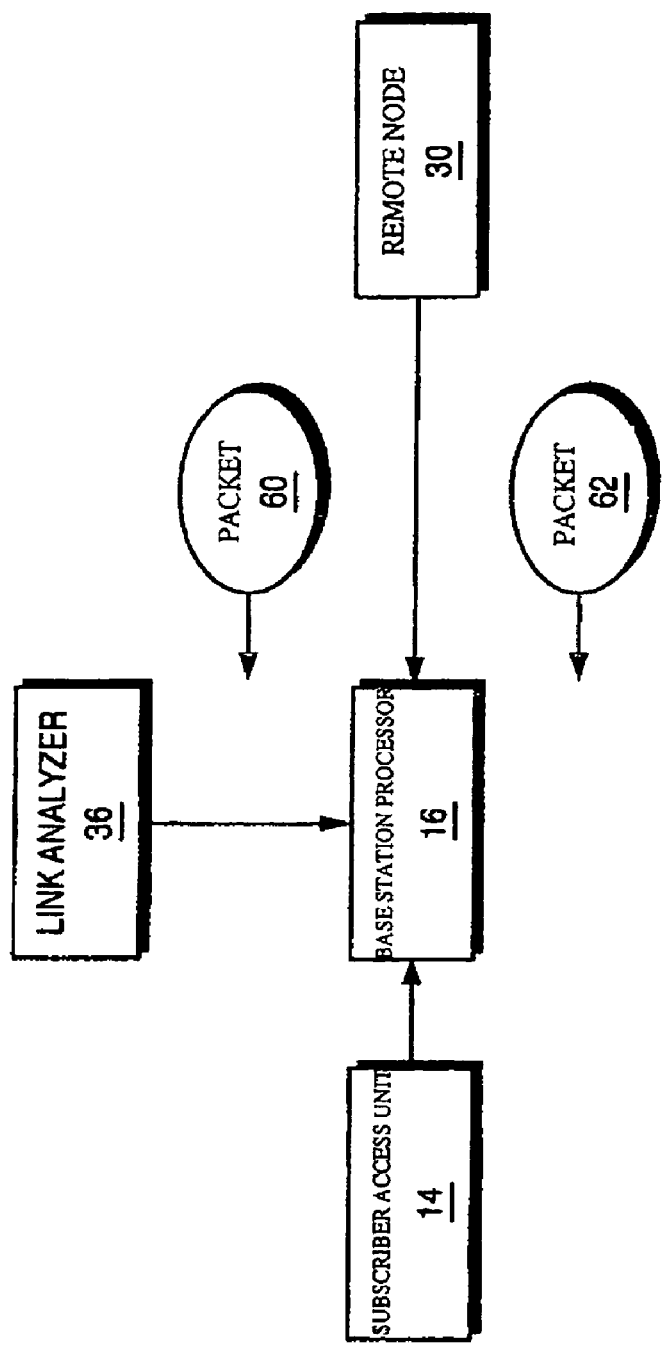
FIG. 6 shows an example of application specific traffic optimization.

Referring to FIGS. 3, 4, and 6, an example of optimal packet flow parameters as defined by the present claims is shown. A packet flow including packet 60 has a port number value of 7070. Accordingly, the flow model index 55 is determined to be F3 stored in flow model table 34 entry 34c. The transfer model index 52 corresponding to entry 34c is T30. Indexing into the transfer model table 42 with transfer model index T30 yields transfer model entry 54c. The corresponding link control parameters for transfer model entry 54c include ARQ (automatic repeat request) disable 72 value of Y (yes), minimum suggested bandwidth 74 of 28 k, average suggested bandwidth 76 of 32 k, and maximum suggested bandwidth 78 of 40 k. Since the application ID 50 is realaudio, we know that this is a streaming audio connection and therefore is loss tolerant. Accordingly, the ARQ disable may be set to Y because we need not retransmit a lost packet for the reasons described above. Similarly, the suggested bandwidth fields 74, 76, and 78 are set to the values corresponding to that application type.

On the other hand, the message packet 62 is analyzed to have a port number of 69. Determining the flow model index 55 results in a value of F2. Indexing into the flow model table 34 using index 55 of F2 yields flow model entry 34b, corresponding to transfer model index T20. Computing the corresponding transfer model entry 54n in the transfer model table 42 indicates that entry 54b corresponds to T20. The corresponding link control parameters 46 for entry 54b include ARQ disable value of N (no), minimum suggested bandwidth of 48 k, average suggested bandwidth of 64 k, and maximum suggested bandwidth of 80 k. Since flow model entry 34b indicates a data type of trivial file transfer protocol (tftp), error-free transmission is suggested. Accordingly, the ARQ flag should not be disabled, and the suggested bandwidths are relatively larger, as shown in entry 54b, as is determined to be most efficient for the corresponding application type.

As indicated above, the foregoing example illustrates the use of a port number as a link performance characteristic and the ARQ flag and suggested bandwidth ranges as a link control parameter. In alternate embodiments other variables may also be employed without departing from the invention as claimed below. In particular, the application specific data derivable from a data packet is employed in computing a loss tolerance of the type of data on the connection, and modifying the connection to specific, optimal values for the particular data type. For example, the delay 80 link control parameter is used to specify a maximum delay which may occur between transmissions to avoid starving the user with real-time information, such as audio and video. Similarly, jitter 82 refers to the maximum variance between transmissions which should be permitted which still allows the user to maintain the incoming stream.

Figure 7:
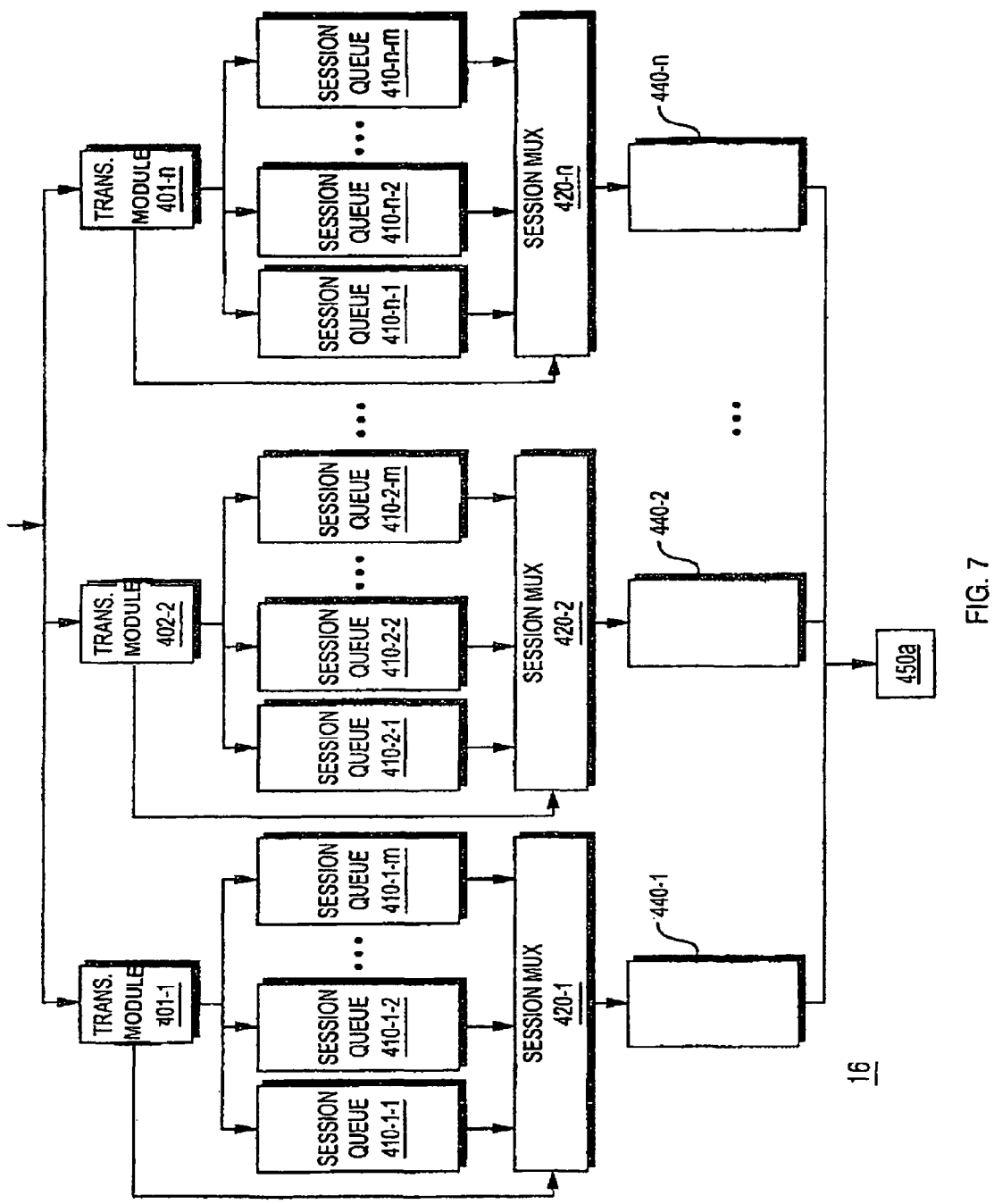
FIG. 7 shows a diagram of a particular architecture in a base station processor adapted for application specific traffic optimization as described herein.

FIG. 7 shows a particular embodiment of base station processor 16 architecture for implementing application specific traffic optimization. This architecture is operable for wireless channel allocation and message transmission as described in co-pending U.S. patent application entitled "Dynamic Bandwidth Allocation for Multiple Access Communication Using Session Queues,", which is a continuation-in-part of a prior U.S. patent application Ser. No. 09/088,527 filed Jun. 1, 1998, entitled "Dynamic Bandwidth Allocation for Multiple Access Communications Using Buffer Urgency Factor." The entire teachings of the above applications are incorporated herein by reference.

Referring to FIG. 7, at the base station 16, incoming traffic is separated into individual traffic flows destined for separate subscriber access units 14 generally (FIG. 1). The traffic flows may be separated by various methods, such as by examining a destination address field in the TCP/IP header. The individual traffic flows are delivered first to transport modules 401-1, 401-2, . . . , 401-n with a transport module 401 corresponding to each of the intended subscriber units 14. A given transport module 401 is the first step in a chain of processing steps that is performed on the data intended for each subscriber unit 14. This processing chain includes not only the functionality implemented by the transport module 401 but also a number of session queues 410, a session multiplexer 420, and transmission buffers 440. The outputs of the various transmission buffers 440-1, 440-2, . . . , 440-n are then assembled by a transmit processor 450 that formats the data for transmission over the forward radio links.

Returning attention now to the top of the FIG. 7 again, each transport module 401 has the responsibility of either monitoring the traffic flow in such a way that it stores data belonging to different transport layer sessions in specific ones of the session queues 410 associated with that transport module 401. For example, transport module 401-1 assigned to handle data intended to be routed to subscriber unit 14 has associated with it a number, m, of session queues 410-1-1, 410-1-2, . . . , 410-1-m. In the preferred embodiment, a given session may be characterized by a particular transport protocol in use. For example, in a session oriented transport protocol, a session queue 410 is assigned to each session. Such session transport oriented protocols include, for example, Transmission Control Protocol. In sessionless transport protocols, a session queue 410 is preferably assigned to each stream. Such sessionless protocols may for example be the Universal Datagram Protocol (UDP). Thus traffic destined for a particular subscriber unit 14 is not simply routed to the subscriber unit 14. First, traffic of different types from the perspective of the transport layer are first routed to individual session queues 410-1-1, 410-1-2, . . . , 410-1-m, associated with that particular connection. In accordance with the system as defined above, traffic indicating a new connection is analyzed to determine link performance characteristics 44 for the messages received on that connection. The link performance characteristics 44 are analyzed to determine a flow model index 55, as described above with respect to FIG. 3. The flow model is then used to compute a transfer model entry 54 as described above with respect to FIG. 4. The transport module 401 invokes the link performance characteristics 46 corresponding to the computed transfer model entry 54, and applies them to the session queue 410-n-m for this connection.

Another key function performed by the transport module 401-1 is to assign priorities to the individual queues 410-1 associated with it. It will later be understood that depending upon the bandwidth available to a particular subscriber unit 14, traffic of higher priority will be delivered to the transmission buffer 440-1 before those of lower priority, as determined by the transfer model and the associated link control parameters 46 in the transfer model table 42. This may include traffic that is not session oriented, for example, real time traffic or streaming protocols that may be carrying voice and/or video information. More particularly, the transport module 401-1 reports the priorities of each of the individual session queues 410-1 to its associated session multiplexer 420. Traffic of higher priority will be selected by the session multiplexer 420 for loading into the transmit buffer 440-1 for loading traffic of lower priority, in general as determined by the link control parameters 46 from the entries 54 in the transfer model table 42.

Those skilled in the art should readily appreciate that the programs defining the operations and methods defined herein are deliverable to a subscriber access unit and to a base station processor in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While the system and method for application specific traffic optimization have been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A base station for controlling communication parameters of a wireless communication link between a local node and the base station, comprising:

a link controller operable to analyze link performance characteristics indicative of the transmission quality of a message received from a remote node on a remote link that conforms to a protocol different than that used for the wireless communication link, and further operable to apply link control parameters received from a transfer model database to the wireless communication link;

a flow model database including stored performance metrics defined to enumerate sets of performance characteristics corresponding to the remote link; and the transfer model database comprising the link control parameters corresponding to a particular flow model entry in the flow model database.

2. The base station of claim 1 wherein the link controller is further operable to compute a flow model database entry by determining a port number corresponding to the message.

3. The base station of claim 1 wherein the link controller is operable to determine a port number indicative of a particular application.

4. The base station of claim 3 wherein the port number is predefined for the particular application.

5. The base station of claim 4 wherein the particular application is indicative of a type of data included in the message.

6. The base station of claim 1 wherein the link controller is further operable to determine the performance characteristics based on a data type of the message.

7. The base station of claim 2 wherein the link controller is further operable to apply the link control parameters corresponding to the transfer model based on the type of data on the link.

8. The base station of claim 1 wherein the wireless link is part of a logical connection.

9. The base station of claim 8 wherein the logical connection conforms to a protocol.

10. The base station of claim 9 wherein the protocol is UDP/IP.

11. The base station of claim 9 wherein the protocol is TCP/IP.

* * * * *